United States Patent
Spindler et al.

(10) Patent No.: US 8,148,304 B2
(45) Date of Patent: Apr. 3, 2012

(54) COPOLYMER BASED ON A SULFONIC ACID-CONTAINING COMPOUND

(75) Inventors: Christian Spindler, Ludwigshafen (DE); Andrea Assmann, Unterreit (DE); Uwe Huber, Garching (DE)

(73) Assignee: BASF SE, Ludwigshafen (DE)

( * ) Notice: Subject to any disclaimer, the term of this patent is extended or adjusted under 35 U.S.C. 154(b) by 48 days.

(21) Appl. No.: 12/739,392

(22) PCT Filed: Nov. 24, 2008

(86) PCT No.: PCT/EP2008/066073
§ 371 (c)(1),
(2), (4) Date: Jun. 3, 2010

(87) PCT Pub. No.: WO2009/074447
PCT Pub. Date: Jun. 18, 2009

(65) Prior Publication Data
US 2010/0305007 A1    Dec. 2, 2010

(30) Foreign Application Priority Data
Dec. 12, 2007   (DE) .......... 10 2007 059 844

(51) Int. Cl.
C09K 8/03  (2006.01)
C04B 7/00  (2006.01)
C04B 24/26 (2006.01)
C08F 12/30 (2006.01)

(52) U.S. Cl. ........ 507/120; 106/725; 106/727; 106/728; 106/772; 507/121; 507/122; 507/224; 507/225; 507/226; 507/227; 507/904; 523/130; 524/2; 526/287; 526/288

(58) Field of Classification Search .......... 507/120–122, 507/224–227, 904; 106/725, 727, 728, 771; 523/130; 524/2; 526/287, 288
See application file for complete search history.

(56) References Cited

U.S. PATENT DOCUMENTS

| | | | |
|---|---|---|---|
| 4,557,763 A | 12/1985 | George et al. | |
| 5,112,400 A | 5/1992 | Nae et al. | |
| 5,368,850 A | 11/1994 | Cauwet et al. | |
| 5,372,642 A | 12/1994 | Bartz et al. | |
| 5,470,383 A | 11/1995 | Schermann et al. | |
| 5,898,042 A * | 4/1999 | Sawada et al. | 523/201 |
| 6,824,606 B1 | 11/2004 | Alvarez Berenguer et al. | |
| 7,202,319 B2 | 4/2007 | Spindler et al. | |
| 2004/0000403 A1 | 1/2004 | Eoff et al. | |
| 2004/0094070 A1 | 5/2004 | Eoff et al. | |
| 2004/0159431 A1 | 8/2004 | Eoff et al. | |
| 2005/0143543 A1 | 6/2005 | Spindler et al. | |

FOREIGN PATENT DOCUMENTS

| | | |
|---|---|---|
| DE | 31 44 770 A1 | 5/1983 |
| DE | 195 34 719 A1 | 3/1997 |
| DE | 195 43 304 A1 | 5/1997 |
| EP | 0 163 459 A1 | 12/1985 |
| EP | 0 445 653 A1 | 9/1991 |
| EP | 0 630 871 A1 | 12/1994 |
| EP | 0 773 198 A1 | 5/1997 |
| EP | 1 090 889 A1 | 4/2001 |
| EP | 1 375 818 A1 | 1/2004 |
| FR | 2 698 004 A1 | 5/1994 |
| FR | 2698004 A1 | 5/1994 |
| WO | WO 03/085013 A2 | 10/2003 |

* cited by examiner

*Primary Examiner* — Timothy J. Kugel
(74) *Attorney, Agent, or Firm* — Fulbright & Jaworski L.L.P.

(57) ABSTRACT

A copolymer containing, as monomer components, a) at least one sulfonic acid-containing compound, b) at least one nitrogen-containing N-vinylamide, one acrylamide or methacrylamide and c) at least one bifunctional or higher-functional vinyl ether is proposed. These copolymers are suitable in particular as thixotropic agents, antisegregation agents and water retention agents and overall as an additive in cement-containing but also gypsum-based systems. Such copolymers having a molecular weight of >40 000 g/mol can be used in particular as admixtures in the exploration of mineral oil and natural gas deposits.

21 Claims, No Drawings

COPOLYMER BASED ON A SULFONIC ACID-CONTAINING COMPOUND

This application is a §371 of PCT/EP2008/066073 filed on Nov. 24, 2008, and claims priority from DE 10 2007 059 844.2 filed Dec. 12, 2007.

The present invention relates to a copolymer based on a sulfonic acid-containing compound.

In the construction chemistry sector, water retention agents used in particular in mortar systems, such as, for example, tile adhesives, are known to be able to keep the so-called mixing water in the mortar system and to prevent it from being absorbed by the substrate as a result of negative capillary forces. The withdrawal of relatively large proportions of the mixing water could adversely affect the hardening of the mortar systems and lead to poor product qualities.

Numerous water retention agents have already been described in the prior art.

Thus, for example, EP 1 090 889 A1 describes an additive for special gypsums and mortars, mixtures of clay and guar being mentioned as typical water retention agents.

According to DE 195 43 304 A1 and U.S. Pat. No. 5,372,642, cellulose derivatives are used as water retention agents. The German laid-open application mentioned teaches admixtures for water-containing building material mixtures, which describe, inter alia, water-soluble cellulose derivatives containing sulfo, carboxyl or sulfate groups and a vinyl (co) polymer containing sulfonic acid and/or carboxylic acid and/or a condensate based on aminoplast builder or aryl compounds and formaldehyde. These admixtures are distinguished by good water retentivity and simultaneously excellent rheology-modifying properties in building material mixtures based on cement, lime, gypsum, anhydrite and other hydraulically setting binders. Said US patent describes the use of carboxymethyl ethers, methylhydroxyethylcellulose ethers or methylhydroxypropylcellulose ethers as an additive to mixtures containing hydrated lime and cement. In this case too, the mixtures described are said to improve the water retention capacity of the construction chemistry compositions.

In addition, thixotropic agents are often also added to mortars in order to reduce or avoid the flowing of mortar out of gaps to be prepared or from vertical surfaces. With the aid of this thixotropic agent, the freshly prepared mortar composition is stiffened and in some cases the adhesion to the substrate is also improved.

EP 0 773 198 A1 describes a thickener system for building material mixtures without relying on polyacrylamide. In addition to at least one cellulose ether, at least one starch ether and at least one layered silicate are also used in this thickener system. The advantageous properties of this thickener system are said to be displayed in particular in cement tile adhesives and gypsum filling compounds. EP 0 445 653 A1 presents a thickener composition based on clay and a modified cellulose. Hectorite is mentioned as a typical clay mineral and hydroxyethylcellulose as a cellulose representative. A composition comprising cellulose ethers and synthetic hectorite is described in German laid-open application DE 195 34 719 A1. Such thickener compositions are used for the production of building material products. Such systems are said to be distinguished by good adhesive strength values, in particular under the action of water, and substantially reduce slipping, for example of vertical concrete slabs. Further thickener combinations for building material products are described in European application EP 0 630 871 A1. Such combinations are chosen from nonionic cellulose ethers soluble in water or in aqueous surfactant solutions and selected surfactants or naphthalenesulfonic acid condensates. It is said that such combinations permit application-relevant improvements in the processing properties of building material products.

In the case of mortars, the person skilled in the art generally distinguishes between gypsum-based and cement-based systems. It is still desirable to have available thixotropic agents or water retention agents which show good efficiency in both systems. Often, further additives, such as retardants, latices or plasticizers, are added to the mortars in order additionally to extent the spectrum of effectiveness. Of course, good compatiblity of the water retention agent or thixotropic agents on the one hand and the other additives customarily used on the other hand is always important.

In the exploration and in particular drilling for mineral oil and natural gas, it is necessary to seal the suitable rock formations from the well but also from other formations. These sealing measures prevent water or gas from the formation from penetrating into the well or organic fluids from the well penetrating into the surrounding rock formations. In this context, there is often the danger that water will be forced out of the cement slurry into the surrounding rock by the hydrostatic pressure of the cement column. This can be prevented by the addition of so-called fluid loss control additives, which once again are water retention agents. The addition of such fluid loss control additives results in sealing of the filter cake forming from water losses between the cement slurry and the rock formation. Typical water retention agents which are often used in this context are described, for example, in DE 31 44 770 A1. They are water-soluble copolymers based on vinyl monomers. EP 0 163 459 A1 describes cement compositions for use in the cementing of oil, gas and water wells. Such compositions contain condensates of formaldehyde with acetone, but also acetone-containing compounds which comprise polymers containing sodium sulfonate groups.

In addition to the water retentivity and the thixotropic power, a further criterion for fresh and still unhardened cement slurries is their phase stability. In the production of ready-mixed concrete and precast concrete parts, but also in well cementing, cement slurries which tend to partial separation are frequently used. In all fields of use, this leads to considerable technical problems, since both the adhesion and the tightness are often unsatisfactory to a dramatic extent. For this reasons, attempts were made and are being made to provide novel compounds which firstly have pronounced water retentivity, also improve the thixotropic power and finally prevent separation.

As a rule, still further additives, such as plasticizers and retardants, are added to cement slurries. However, these additives are effective as a rule only when they are adsorbed on one or more clinker phases or on crystal phases which form during the hydration of the cement. If different additives are used, they compete for the adsorption sites present on the crystal phases.

On the basis of the described disadvantages of the prior art, it was the object of the present invention to provide a novel copolymer which is based on a sulfonic acid-containing compound and can be used as an additive, but in particular as a thixotropic agent, antisegregation agent and water retention agent, in cement-containing systems. The efficiency of these copolymers should be stable in said fields of use and especially should not be adversely influenceable by other additives usually used.

This object was achieved with the aid of a copolymer containing, as monomer components, a) at least one sulfonic acid-containing compound, b) at least one nitrogen-containing N-vinylamide, one acrylamide or methacrylamide, and c) at least one at least bifunctional vinyl ether.

With this polymer according to the invention, it was possible not only to achieve the object completely. Surprisingly, it was also found that the copolymers can be successfully used not only in cement-containing systems but also in gypsum-based systems. Thus, the copolymers described show their distinctively good effect as water retention agent and thixotropic agent also in cement-free and gypsum-based aqueous systems. However, the polymers according to the present invention can also be used as thickeners or water retention agents in clay-based systems. Such clay-based systems are used, for example, in slotted wall construction or as drilling fluids.

A copolymer which, according to the invention, has a molecular weight of >40 000 g/mol, preferably >80 000 g/mol and particularly preferably >100 000 g/mol has proven particularly suitable.

The monomer component a) should be at least one compound which is selected from the series consisting of 2-acrylamido-2-methylpropanesulfonic acid (AMPS), 2-acrylamidopropanoic acid, styrenesulfonic acid, vinylsulfonic acid, allylhydroxypropanesulfonic acid, suitable salts thereof or any mixtures. In the context of the present invention, in particular, N-vinylcaprolactam, N—N-dimethylacrylamide, N—N-diethylacrylamide, isopropylacrylamide, N—N-diethylacrylamide, isopropylacrylamide, N-vinylpyrolidone, N-vinylacetamide, N-vinylformamide, N-methyl-N-vinylacetamide, N-alkyl acrylate, N-alkyl methacrylate and mixtures thereof are suitable as monomer component b), said alkyl radicals, independently of one another, having 1 to 12 carbon atoms and also being permitted to be branched.

Finally, the component c), i.e. the at least bifunctional vinyl ether, should be selected from the series consisting of triethylene glycol divinyl ether, 4-hydroxybutyl vinyl ether, diethylene glycol divinyl ether or butanediol divinyl ether.

It is true that said components and their particularly suitable representatives may be present according to the invention in any proportions in the claimed copolymer. However, it has proven advantageous if the monomer components a), b) and c) are contained in the weight ratio of 40 to 90%:2 to 40%:0.05 to 5.0%. Preferably, the weight ratio is 50 to 80:10 to 30:0.5 to 3% by weight and particularly preferably 60 to 70%:10 to 20%:1.5 to 2%.

In addition to the copolymer itself, the present invention also comprises the use thereof. Here, in particular the use of the described copolymers as an additive to compositions containing hydraulic binders and/or water-swellable components is claimed. In particular, the use as an additive to cement-, $CaSO_4$- or clay-based compositions is suitable, the use as water retention agent, thickener or thixotropic agent being of particular importance.

Since the disadvantages known from the prior art are also familiar especially from the exploration of mineral oil and natural gas deposits, the present invention comprises a use variant in which the novel copolymers are used in well cement slurries, drilling fluids or stimulation fluids. This use can be effected in particular in combination with other construction chemistry additives, such as rheology modifiers, setting retarders, setting accelerators, air-entraining agents, water repelling agents and mixtures thereof.

Finally, the present invention also envisages that the copolymer is added to the construction chemistry composition, independently of the respective field of use, in an amount of from 0.05 to 5% by weight, preferably from 0.1 to 2.0% by weight and particularly preferably from 0.2 to 1.0% by weight.

In summary, it may be stated that the proposed copolymer, based on the three monomer components a), b) and c), is outstandingly suitable as water retention agent, thickener and thixotropic agents and thus meets all requirements which are set for modern additives in the modern construction chemistry sector.

The following examples illustrate the advantages of the copolymers within the proposed fields of use.

1. PREPARATION EXAMPLES

Example 1.1

46.5 g of calcium hydroxide were stirred into 1200 g of tap water. 185 g of 2-acrylamido-2-methylpropanesulfonic acid and 17.4 g of maleic anhydride were then added. The solution was heated to 50° C. and 26 g of N-vinylcaprolactam and 1 g of triethylene glycol divinyl ether were then added. The reaction solution was heated to 62° C. and then 4 g of 4-hydroxybutyl vinyl ether and 0.9 g of 2,2'-azobis(2-amidinopropane) dihydrochloride were added. This reaction solution was stirred for a further half hour.

Example 1.2

The synthesis was effected analogously to Example 1.1, but 1.4 g of triethylene glycol divinyl ether were added.

Example 1.3

275 g of calcium hydroxide were stirred into 6800 g of water. 1000 g of 2-acrylamido-2-methylpropanesulfonic acid and 100 g of maleic anhyhdride were then added. After the solution had been heated to 50° C., 150 g of N-vinylcaprolactam and 1.6 g of mercaptoethanol as the chain transfer agent were added. The reaction solution was heated to 62° C. and then 12 g of diethylene glycol divinyl ether and 5 g of 2,2'-azobis(2-amidinopropane) dihydrochloride were added. Stirring was effected for a further half hour.

Example 1.4

25 g of calcium hydroxide were dissolved in 600 g of water and then 92 g of 2-acryl-amido-2-methylpropanesulfonic acid, 8.7 g of maleic anhydride and 1.2 g of vinylphosphonic acid were added. The initially introduced mixture was heated to 50° C. and 13 g of N-vinylcaprolactam were added. Further heating to 68° C. was effected, after which 0.3 g of diethylene glycol divinyl ether was added and immediately thereafter initiation was effected with 0.5 g of 2,2'-azobis(2-amidinopropane) dihydrochloride. The reaction solution was stirred for a further half hour.

Example 1.5

16 g of calcium hydroxide were dissolved in 200 ml of water. 61 g of 2-acrylamido-2-methylpropanesulfonic acid and 4.3 g of acrylic acid were then added. The reaction solution was heated to 50° C., 8.6 g of N-vinylcaprolactam were added and the reaction solution was further heated to 62° C. After this temperature had been reached, 1.4 g of 4-hydroxybutyl vinyl ether and 0.3 g of triethylene glycol divinyl ether were added. Immediately after addition of the two vinyl ethers, initiation was effected with 0.3 g of 2,2'-azobis(2-amidinopropane) dihydrochloride. The reaction solution was stirred for a further half hour.

Example 1.6

17.3 g of calcium hydroxide were dissolved in 600 ml of water. 92 g of 2-acrylamido-2-methylpropanesulfonic acid were then added. The reaction solution was heated to 50° C., 13 g of N-vinylcaprolactam were then added and the reaction solution was further heated to 62° C. After this temperature had been reached, and 0.3 g of triethylene glycol divinyl ether was added. Immediately after addition of the vinyl ethers, initiation was effected with 0.45 g of 2,2'-azobis(2-amidinopropane) dihydrochloride. The reaction solution was stirred for a further half hour.

Example 1.7

20.8 g of calcium hydroxide were dissolved in 600 ml of water. 92 g of 2-acrylamido-2-methylpropanesulfonic acid and 6.4 g of acrylic acid were then added. The reaction solution was heated to 50° C., 13 g of N-vinylcaprolactam were added and the reaction solution was further heated to 62° C. After this temperature had been reached, 0.3 g of diethylene glycol divinyl ether were added. Immediately after addition of the vinyl ether, initiation was effected with 0.45 g of 2,2'-azobis(2-amidinopropane) dihydrochloride. The reaction solution was stirred for a further half hour.

Example 1.8

Gel Polymerization 17.3 g of calcium hydroxide were dissolved in 600 ml of water. 92 g of 2-acrylamido-2-methylpropanesulfonic acid and 18 g of N,N-dimethylacrylamide were then added. The reaction solution was heated to 50° C., 13 g of N-vinylcaprolactam were then added and the reaction solution was heated further to 62° C. After this temperature had been reached, 0.4 g of triethylene glycol divinyl ether and 0.1 g of mercaptoethanol were added. Immediately after addition of the vinyl ether, initiation was effected with 0.45 g of 2,2'-azobis(2-amidinopropane) dihydrochloride. The reaction solution was left to stand for a further half hour.

Example 1.9

24.9 g of potassium hydroxide were dissolved in 600 ml of water. 92 g of 2-acrylamido-2-methylpropanesulfonic acid and 10 g of isopropylacrylamide were then added. The reaction solution was heated to 50° C., 13 g of N-vinylcaprolactam were then added and the reaction solution was further heated to 62° C. After this temperature had been reached, 0.3 g of triethylene glycol divinyl ether was added. Immediately after addition of the vinyl ether, initiation was effected with 0.45 g of 2,2'-azobis(2-amidinopropane) dihydrochloride. The reaction solution was stirred for a further half hour.

Example 1.10

24.2 g of calcium hydroxide were dissolved in 600 g of water. 92 g of 2-acrylamido-2-propanesulfonic acid and 8.7 g of maleic anhydride were then added. The reaction solution was heated to 50° C. After the heating, 11 g of N-vinylpyrrolidone were added, and the reaction solution was then heated further to 62° C. Directly before the initiation with 0.45 g of 2,2'-azobis(2-amidinopropane) dihydrochloride, 0.3 g of diethylene glycol divinyl ether was added. The reaction solution was stirred for a further half hour.

Example 1.11

24.9 g of sodium hydroxide were dissolved in 600 ml of water. 92 g of 2-acrylamido-2-methylpropanesulfonic acid and 11.5 g of itaconic acid were then added. The reaction solution was heated to 50° C., 13 g of N-vinylcaprolactam were added and the reaction solution was further heated to 62° C. After this temperature had been reached, 5 g of diethylene glycol divinyl ether were added. Immediately after addition of the vinyl ether, initiation was effected with 0.45 g of 2,2'-azobis(2-amidinopropane) dihydrochloride. The reaction solution was stirred for a further half hour.

Example 1.12

17.8 g of sodium hydroxide were dissolved in 570 ml of water. 92 g of styrenesulfonic acid and 38.4 g of a 30% strength aqueous solution of vinylsulfonic acid sodium salt were then added. The reaction solution was heated to 50° C., 13 g of N-vinylacetamide were then added and the reaction solution was further heated to 62° C. After this temperature had been reached, 0.3 g of triethylene glycol divinyl ether were added. Immediately after addition of the vinyl ether, initiation was effected with 0.45 g of 2,2'-azobis(2-amidinopropane) dihydrochloride. The reaction solution was stirred for a further half hour.

Example 1.13

24 g of calcium hydroxide were dissolved in 600 g of water. 92 g of 2-acrylamido-propanesulfonic acid and 9.6 g of vinylphosphonic acid were added. The reaction solution was heated to 62° C. and 1.5 g of diethylene glycol divinyl ether and 0.1 g of mercaptoethanol were then added. The polymerization was initiated with 1.2 g of sodium persulfate, and stirring was effected for a further half hour.

2. USE EXAMPLES

Example 2.1

The effect of the polymers according to the invention as antisegregation agents for cement slurries was determined according to DIN EN 480-4. For this purpose, 1500 g of cement CEM I 42.5 R were mixed with 900 g of tap water and 7.5 g of polymer, 900 ml of this mixture were introduced into a measuring cylinder, the bleed water was taken off after certain times and the mass thereof in g was determined. The following cumulative values were obtained (Table 1):

TABLE 1

Bleed water values for CEM I 42.5 R cement (w/c = 0.6; 0.5% by weight of polymer, based on cement)

| Polymer from Example | Bleed water (g) after | | |
|---|---|---|---|
| | 10 min | 60 min | 120 min |
| — | 3.9 | 75.1 | 134.4 |
| 1.1 | 0.7 | 1.5 | 2.1 |
| 1.2 | 0.4 | 1.0 | 1.3 |
| 1.3 | 0.2 | 0.4 | 0.6 |
| 1.4 | 0.7 | 1.4 | 2.0 |
| 1.5 | 0.2 | 0.3 | 0.4 |
| 1.6 | 0.0 | 0.0 | 0.0 |
| 1.7 | 0.1 | 0.2 | 0.2 |
| 1.8 | 0.0 | 0.0 | 0.0 |
| 1.9 | 0.0 | 0.0 | 0.0 |
| 1.10 | 0.0 | 0.0 | 0.0 |
| 1.11 | 3.6 | 27.0 | 65.6 |
| 1.12 | 0.0 | 2.7 | 18.3 |
| 1.13 | 0.0 | 2.3 | 9.2 |

Example 2.2

The polymers according to the invention are also suitable as water retention agents for cement slurries. The water retentivity of the cement slurries treated with the polymers according to the invention was determined according to DIN 18 555. 350 g of CEM I 42.5 R cement were mixed with 210 g of tap water and 2.5 g of polymer and homogenized. The results obtained are shown in Table 2.

TABLE 2

Water retentivity of the polymers described according to the invention in CEM I 42.5 R cement slurries

| Polymer | Water retentivity (%) |
|---|---|
| — | 64.8 |
| 1.1 | 97.2 |
| 1.2 | 98.3 |
| 1.3 | 91.5 |
| 1.4 | 96.3 |
| 1.5 | 95.2 |
| 1.6 | 95.8 |
| 1.7 | 98.2 |
| 1.8 | 97.8 |
| 1.9 | 97.0 |
| 1.10 | 97.4 |
| 1.11 | 91.9 |
| 1.12 | 83.6 |
| 1.13 | 91.7 |

Example 2.3

The thickening effect of the polymers according to the invention of cement slurries was determined with the aid of the slump. A commercially available methylcellulose was chosen as a reference. 0.75 g of polymer was dissolved in 180 g of tap water and then 300 g of cement CEM I42.5 R were added. The slurry was allowed to stand for 60 sec and then thoroughly stirred for 120 sec. The slurry was poured up to the rim into a Vicat ring (H=40 mm, $d_{small}$=65 mm, $d_{large}$=75 mm) standing on a glass plate. The Vicat ring was raised 2 cm and held above the outflowing slurry for about 5 sec. The diameter of the slurry which had flowed out was measured at two axes at right angles to one another. The measurement was repeated once. The arithmetic mean of all four measured values gives the slump. The values obtained are shown in Table 3.

TABLE 3

Slump of the CEM I 42.5 R cement slurries treated with the polymers according to the invention

| Polymer | Slump cm |
|---|---|
| — | 26.0 |
| Methylcellulose (reference) | 22.0 |
| 1.1 | 19.0 |
| 1.2 | 19.8 |
| 1.3 | 18.9 |
| 1.4 | 19.3 |
| 1.5 | 17.8 |
| 1.6 | 21.0 |
| 1.7 | 16.5 |
| 1.8 | 9.4 |
| 1.9 | 24.5 |
| 1.10 | 16.5 |
| 1.11 | 29.5 |
| 1.12 | 22.5 |
| 1.13 | 21.0 |

Example 2.4

The polymers according to the invention are suitable as water retention agents for plaster cements ("Gipsleim"). The water retentivity of the plaster cements treated with the polymers according to the invention was determined according to DIN 18 555. 350 g of β-hemihydrate were mixed with 210 g of tap water, 0.25 g of Retardan®P (retardant for gypsums from Tricosal, Illertissen) and 2.5 g of polymer and were homogenized. The results obtained were compared with a commercially available methylcellulose. The measured results are shown in Table 4.

TABLE 4

Water retentivity of the polymers described according to the invention in plaster cements

| Polymer | Water retentivity (%) |
|---|---|
| — | 73.2 |
| Methylcellulose (reference) | 98.7 |
| 1.1 | 94.8 |
| 1.2 | 95.3 |
| 1.3 | 95.4 |
| 1.4 | 94.6 |
| 1.5 | 96.3 |
| 1.6 | 96.9 |
| 1.7 | 98.6 |
| 1.8 | 96.8 |
| 1.9 | 97.7 |
| 1.10 | 89.9 |
| 1.11 | 89.0 |
| 1.12 | 89.2 |
| 1.13 | 92.2 |

Example 2.5

The thickening effect of the polymers according to the invention in plaster cement was determined with the aid of a FANN rotational viscometer ($r_{rotor}$=1.8415 cm, $r_{stator}$=1.7245 cm, $h_{stator}$=3.800 cm, $d_{annular\ gap}$=0.1170 cm, instrument constant K=300.0 (spring F1)). The reference chosen was a commercially available methylcellulose. 0.25 g of Retardan®P (retardant for gypsums from Tricosal, Illertissen) and 0.75 g of polymer were dissolved in 245 g of tap water and then 350 g of β-hemihydrate were stirred in. The viscosity of the plaster cement was then measured at a shear gradient $\dot{\gamma}$ of 10.2 s$^{-1}$. The values obtained are shown in Table 5.

TABLE 5

Viscosities of the plaster cements with the polymers according to the invention

| Polymer | Shear stress τ at Y = 10.2 s$^{-1}$ Pa | Viscosity η$_s$ at Y = 10.2 s$^{-1}$ mPas |
|---|---|---|
| — | 6.1 | 600 |
| Methylcellulose (reference) | 7.7 | 750 |
| 1.1 | 15.8 | 1550 |
| 1.2 | 23.0 | 2250 |
| 1.3 | 7.7 | 750 |
| 1.4 | 6.1 | 600 |
| 1.5 | 10.7 | 1050 |
| 1.6 | 15.8 | 1550 |
| 1.7 | 23.0 | 2250 |
| 1.8 | 3.1 | 300 |
| 1.9 | 10.7 | 1050 |
| 1.10 | 29.6 | 2900 |
| 1.11 | 6.1 | 600 |
| 1.12 | 10.7 | 1050 |
| 1.13 | 21.4 | 2100 |

Example 2.6

The polymers described above were investigated in various cement slurries. All cements used were specified according to Guideline 10B of the American Petroleum Institute. The rheology of the cement slurry was determined by means of a FANN 35 viscometer from Chandler according to specification 10 API. The results are summarized in Table 6. From the table, it is clear that the fluid loss control additives according to the invention can be better used together with further additives customarily used in the oilfield than other additives already commercially available. For comparison, a fluid loss control additive already commercialized by BASF under the tradename POLYTROL® 34 and based on a sulfonated organic polymer was used.

Tables 6-11: Viscosities and water loss of carious well cement slurries

TABLE 6

Shear stresses and water loss of various well cement slurries without further additives

| Example | Temp. | Cement | Mixing water | Amount of FLA | Rheology at 600-300-200-100-6-3 rpm [lbf/100 sqft] | Fluid loss |
|---|---|---|---|---|---|---|
| POLYTROL ® 34 | 27° C. | H | 266 g | 3.5 g | >300-220-162-94-11-7 | 25 ml |
| 1.2 | 27° C. | H | 266 g | 3.5 g | 227-130-92-51-5-3 | 22 ml |
| 1.5 | 27° C. | H | 266 g | 3.5 g | >300-186-135-77-7-4 | 40 ml |
| 1.3 | 80° C. | H | 266 g | 3.5 g | 246-151-106-60-7-5 | 90 ml |
| 1.9 | 80° C. | G | 308 g | 3.5 g | 250-181-155-115-64-62 | 346 ml |
| 1.12 | 27° C. | G | 308 g | 3.5 g | 220-132-99-58-11-10 | 540 ml |

TABLE 7

Shear stresses and water loss of various well cement slurries with an additional acetone-formaldehyde-sulfite-based plasticizer

| Example | Temp. | Cement | Mixing water | Amount of FLA | Additional additive | Rheology at 600-300-200-100-6-3 rpm [lbf/100 sqft] | Fluid loss |
|---|---|---|---|---|---|---|---|
| POLYTROL ® 34 | 80° C. | H | 266 g | 3.5 g | 2.8 g AFS | 245-153-105-60-6-4 | 122 ml |
| 1.1 | 80° C. | H | 266 g | 3.5 g | 2.8 g AFS | 241-145-102-58-7-4 | 56 ml |
| 1.4 | 80° C. | H | 266 g | 3.5 g | 2.8 g AFS | 249-166-121-69-7-4 | 50 ml |
| 1.8 | 80° C. | H | 266 g | 3.5 g | 2.8 g AFS | >300-252-180-106-12-7 | 42 ml |
| 1.11 | 80° C. | H | 266 g | 3.5 g | 2.8 g AFS | 136-77-54-30-4-3 | 270 ml |

TABLE 8

Shear stresses and water loss of various well cement slurries with an additional lignosulfonate retardant

| Example | Temp. | Cement | Mixing water | Amount of FLA | Additional additive | Rheology at 600-300-200-100-6-3 rpm [lbf/100 sqft] | Fluid loss |
|---|---|---|---|---|---|---|---|
| POLYTROL ® 34 | 80° C. | G | 308 g | 4.2 g | 1.2 g LS | 175-113-82-49-7-4 | 104 ml |
| 1.1 | 80° C. | G | 308 g | 4.2 g | 1.2 g LS | 205-136-104-67-14-12 | 72 ml |
| 1.2 | 80° C. | G | 308 g | 4.2 g | 1.2 g LS | 230-148-125-72-16-11 | 65 ml |

TABLE 8-continued

Shear stresses and water loss of various well cement slurries with an additional lignosulfonate retardant

| Example | Temp. | Cement | Mixing water | Amount of FLA | Additional additive | Rheology at 600-300-200-100-6-3 rpm [lbf/100 sqft] | Fluid loss |
|---|---|---|---|---|---|---|---|
| 1.6 | 80° C. | H | 266 g | 4.2 g | 1.2 g LS | >300-245-187-119-18-13 | 85 ml |
| 1.10 | 80° C. | H | 266 g | 4.2 g | 1.2 g LS | >300-223-171-109-19-13 | 68 ml |
| 1.13 | 80° C. | H | 266 g | 4.2 g | 1.2 g LS | 173-105-76-44-6-5 | 280 ml |

TABLE 9

Shear stresses and water loss of various well cement slurries with an additional lignosulfonate retardant and an acetone-formaldehyde-sulfite-based plasticizer

| Example | Temp. | Cement | Mixing water | Amount of FLA | Additional additive 1 | Additional additive 2 | Rheology at 600-300-200-100-6-3 rpm [lbf/100 sqft] | Fluid loss |
|---|---|---|---|---|---|---|---|---|
| POLYTROL ® 34 | 80° C. | H | 266 g | 3.5 g | 7 g AFS | 1.2 g LS | 188-106-73-39-4-3 | 205 ml |
| 1.1 | 80° C. | H | 266 g | 3.5 g | 7 g AFS | 1.2 g LS | 227-130-92-51-5-3 | 44 ml |
| 1.2 | 80° C. | H | 266 g | 3.5 g | 7 g AFS | 1.2 g LS | >300-240-178-108-20-17 | 52 ml |
| 1.3 | 80° C. | H | 266 g | 3.5 g | 7 g AFS | 1.2 g LS | 177-108-72-40-4-3 | 32 ml |
| 1.4 | 80° C. | H | 266 g | 3.5 g | 7 g AFS | 1.2 g LS | 193-119-84-45-5-3 | 45 ml |

TABLE 10

Shear stresses and water loss of various well cement slurries with a melamine-formaldehyde-sulfonate-based plasticizer

| Example | Temp. | Cement | Mixing water | Amount of FLA | Additional additive | Rheology at 600-300-200-100-6-3 rpm [lbf/100 sqft] | Fluid loss |
|---|---|---|---|---|---|---|---|
| POLYTROL ® 34 | 80° C. | H | 266 g | 3.5 g | 3.5 g MFS | 189-111-76-42-5-4 | 262 ml |
| 1.1 | 80° C. | H | 266 g | 3.5 g | 3.5 g MFS | 241-14-107-62-7-5 | 80 ml |
| 1.6 | 80° C. | G | 266 g | 4.2 g | 7.0 g MFS | 251-140-99-54-6-4 | 280 ml |
| 1.7 | 80° C. | G | 266 g | 4.2 g | 7.0 g MFS | >300-230-167-96-9-5 | 44 ml |
| 1.13 | 80° C. | H | 266 g | 4.2 g | 7.0 g MFS | 187-120-84-47-5-3 | 210 ml |

TABLE 11

Shear stresses and water loss of various well cement slurries with a polycarboxylate ether-based plasticizer

| Example | Temp. | Cement | Mixing water | Amount of FLA | Additional additive | Rheology at 600-300-200-100-6-3 rpm [lbf/100 sqft] | Fluid Loss |
|---|---|---|---|---|---|---|---|
| POLYTROL ® 34 | 80° C. | H | 266 g | 3.5 g | 1.2 g PCE | 247-146-108-62-6-4 | 55 ml |
| 1.4 | 80° C. | H | 266 g | 3.5 g | 1.2 g PCE | 216-131-95-55-6-4 | 70 ml |
| 1.8 | 80° C. | H | 266 g | 3.5 g | 1.2 g PCE | >300-295-238-148-20-13 | 40 ml |
| 1.9 | 80° C. | H | 266 g | 3.5 g | 1.2 g PCE | 228-134-98-56-5-3 | 42 ml |
| 1.10 | 80° C. | H | 266 g | 3.5 g | 1.2 g PCE | 231-139-102-58-6-3 | 54 ml |

POLYTROL® 34: Commercially available fluid loss control additive from BASF Construction Polymers GmbH, based on a sulfonated organic polymer AFS: Plasticizer condensate of acetone, formaldehyde and sulfite, commercially available as Melcrete® K3F from BASF Construction Polymers GmbH MFS: Plasticizer condensate of melamine, formaldehyde and sulfite, commercially available as MELMENT® F10 from BASF Construction Polymers GmbH PCE: Plasticizer based on a polycarboxylate ether, commercially available from BASF Construction Polymers GmbH as Melflux® 1641

LS: Lignosulfonate

Example 2.7

The thickening effect of the polymers according to the invention of clay suspensions was determined with the aid of a FANN rotational viscometer ($r_{rotor}$=1.8415 cm, $r_{stator}$=1.7245 cm, $h_{stator}$=3.800 cm, $d_{annular\ gap}$=0.1170 cm, instrument constant K=300.0 (spring F1)). For this purpose, 10.0 g of bentonite were suspended in 350 ml of tap water and 0.75 g of polymer was then added. The viscosity of the bentonite suspension was then measured at a shear gradient $\dot{\gamma}$ of 10.2 s$^{-1}$. The values obtained are shown in Table 6.

TABLE 12

Rheology of clay suspensions according to the invention

| Polymer according to Examples 1 | Shear stress at $\dot{\gamma}$ = 10.2 s$^{-1}$ Pa | Viscosity at $\dot{\gamma}$ = 10.2 s$^{-1}$ mPas | Shear stress at $\dot{\gamma}$ = 1021 s$^{-1}$ Pa | Viscosity $\eta_s$ at $\dot{\gamma}$ = 1021 s$^{-1}$ mPas |
|---|---|---|---|---|
| — | 0.5 | 50 | 2.6 | 2.5 |
| 1.1 | 1.0 | 100 | 10.2 | 10.0 |
| 1.2 | 1.5 | 150 | 14.3 | 14.0 |
| 1.3 | 1.0 | 100 | 10.7 | 10.5 |
| 1.4 | 1.5 | 150 | 9.2 | 9.0 |
| 1.5 | 1.5 | 150 | 10.7 | 10.5 |
| 1.6 | 2.0 | 200 | 10.7 | 10.5 |
| 1.7 | 1.0 | 100 | 9.2 | 9.0 |
| 1.8 | 1.0 | 100 | 7.2 | 7.0 |
| 1.9 | 1.0 | 100 | 10.7 | 10.5 |
| 1.10 | 1.5 | 150 | 8.7 | 8.5 |
| 1.11 | 0.5 | 50 | 5.1 | 5.0 |
| 1.12 | 1.0 | 100 | 7.1 | 7.0 |
| 1.13 | 1.0 | 100 | 5.1 | 5.0 |

The invention claimed is:

1. A copolymer comprising, as monomer components,
   a) at least one sulfonic acid-containing compound,
   b) at least one nitrogen-containing N-vinylamide, one acrylamide or methacrylamide, and
   c) at least one at least bifunctional vinyl ether;
   wherein monomer components a), b) and c) are in the weight ratio of 40% to 90%:2% to 40%:0.05% to 5.0%.

2. The copolymer as claimed in claim 1 having a molecular weight of >40,000 g/mol.

3. The copolymer as claimed in claim 1, wherein the monomer component a) is at least one compound selected from the series consisting of 2-acrylamido-2-methylpropanesulfonic acid, styrenesulfonic acid, vinylsulfonic acid, allylhydroxypropanesulfonic acid or the salts thereof.

4. The copolymer as claimed in claim 1, wherein the monomer component b) is at least one compound selected from the series consisting of N-vinylcaprolactam, N—N-dimethylacrylamide, N—N-diethylacrylamide, isopropylacrylamide, N-vinylpyrolidone, N-vinylacetamide, N-vinylformamide, N-methyl-N-vinylacetamide, N-alkyl acrylate or N-alkyl methacrylate.

5. The copolymer as claimed in claim 1, wherein the monomer component c) is at least one compound selected from the series consisting of triethylene glycol divinyl ether, 4-hydroxybutyl vinyl ether, diethylene glycol divinyl ether or butanediol divinyl ether.

6. The copolymer as claimed in claim 1 having a molecular weight of >80,000 g/mol.

7. The copolymer as claimed in claim 1 having a molecular weight of >100,000 g/mol.

8. A method comprising adding the copolymer of claim 1 to a composition comprising at least one member selected from the group consisting of a hydraulic binder and a water-swellable component.

9. The method as claimed in claim 8, wherein the composition further comprises a construction chemistry additive.

10. The method as claimed in claim 9, wherein the construction chemistry additive comprises at least one member selected from the group consisting of a rheology modifier, a setting retardant, a setting accelerator, an air-entraining agent and a water repellent.

11. The method as claimed in claim 8, wherein the copolymer is added as an additive to cement-, CaSO$_4$ or clay-based compositions.

12. The method as claimed in claim 8, wherein the copolymer is added in an amount sufficient to be a water retention agent, thickener or thixotropic agent.

13. The method as claimed in claim 8, wherein the copolymer is added to a well cement slurry, a drilling fluid or a stimulation fluid.

14. The method as claimed in claim 8, wherein the copolymer is added to the composition in an amount of from 0.05 to 5% by weight.

15. A method comprising adding a copolymer to a composition comprising at least one member selected from the group consisting of a hydraulic binder and a water-swellable component, wherein said copolymer comprising, as monomer components,
   a) at least one sulfonic acid-containing compound,
   b) at least one nitrogen-containing N-vinylamide, one acrylamide or methacrylamide, and
   c) at least one at least bifunctional vinyl ether;
   wherein monomer components a), b) and c) are in the weight ratio of 40% to 90%:2% to 40%:0.05% to 5.0%.

16. A method comprising adding a copolymer to a composition comprising at least one member selected from the group consisting of a hydraulic binder and a water-swellable component, wherein said copolymer comprising, as monomer components,
   a) at least one sulfonic acid-containing compound,
   b) at least one nitrogen-containing N-vinylamide, one acrylamide or methacrylamide, and
   c) at least one at least bifunctional vinyl ether;
   wherein said copolymer is added as an additive to cement-, CaSO$_4$ or clay-based compositions.

17. A method comprising adding a copolymer to a composition comprising at least one member selected from the group consisting of a hydraulic binder and a water-swellable component, wherein said copolymer comprising, as monomer components,
   a) at least one sulfonic acid-containing compound,
   b) at least one nitrogen-containing N-vinylamide, one acrylamide or methacrylamide, and
   c) at least one at least bifunctional vinyl ether;
   wherein said copolymer is added in an amount sufficient to be a water retention agent, thickener or thixotropic agent.

18. A method comprising adding a copolymer to a composition comprising at least one member selected from the group consisting of a hydraulic binder and a water-swellable component, wherein said copolymer comprising, as monomer components,
   a) at least one sulfonic acid-containing compound,
   b) at least one nitrogen-containing N-vinylamide, one acrylamide or methacrylamide, and
   c) at least one at least bifunctional vinyl ether;
   wherein the copolymer is added to a well cement slurry, a drilling fluid or a stimulation fluid.

19. A method comprising adding a copolymer to a composition comprising at least one member selected from the group consisting of a hydraulic binder and a water-swellable component, wherein said copolymer comprising, as monomer components, a) at least one sulfonic acid-containing compound, b) at least one nitrogen-containing N-vinylamide, one acrylamide or methacrylamide, and c) at least one at least bifunctional vinyl ether;

wherein the composition further comprises a construction chemistry additive.

20. The method of claim 19, wherein the construction chemistry additive comprises at least one member selected from the group consisting of a rheology modifier, a setting retardant, a setting accelerator, an air-entraining agent and a water repellent.

21. A method comprising adding a copolymer to a composition comprising at least one member selected from the group consisting of a hydraulic binder and a water-swellable component, wherein said copolymer comprising, as monomer components, a) at least one sulfonic acid-containing compound, b) at least one nitrogen-containing N-vinylamide, one acrylamide or methacrylamide, and c) at least one at least bifunctional vinyl ether;

wherein said copolymer is added to the composition in an amount of from 0.05 to 5% by weight.

* * * * *